Aug. 8, 1944.   J. F. SEBALD   2,355,564
WATER TREATING APPARATUS
Filed July 9, 1942
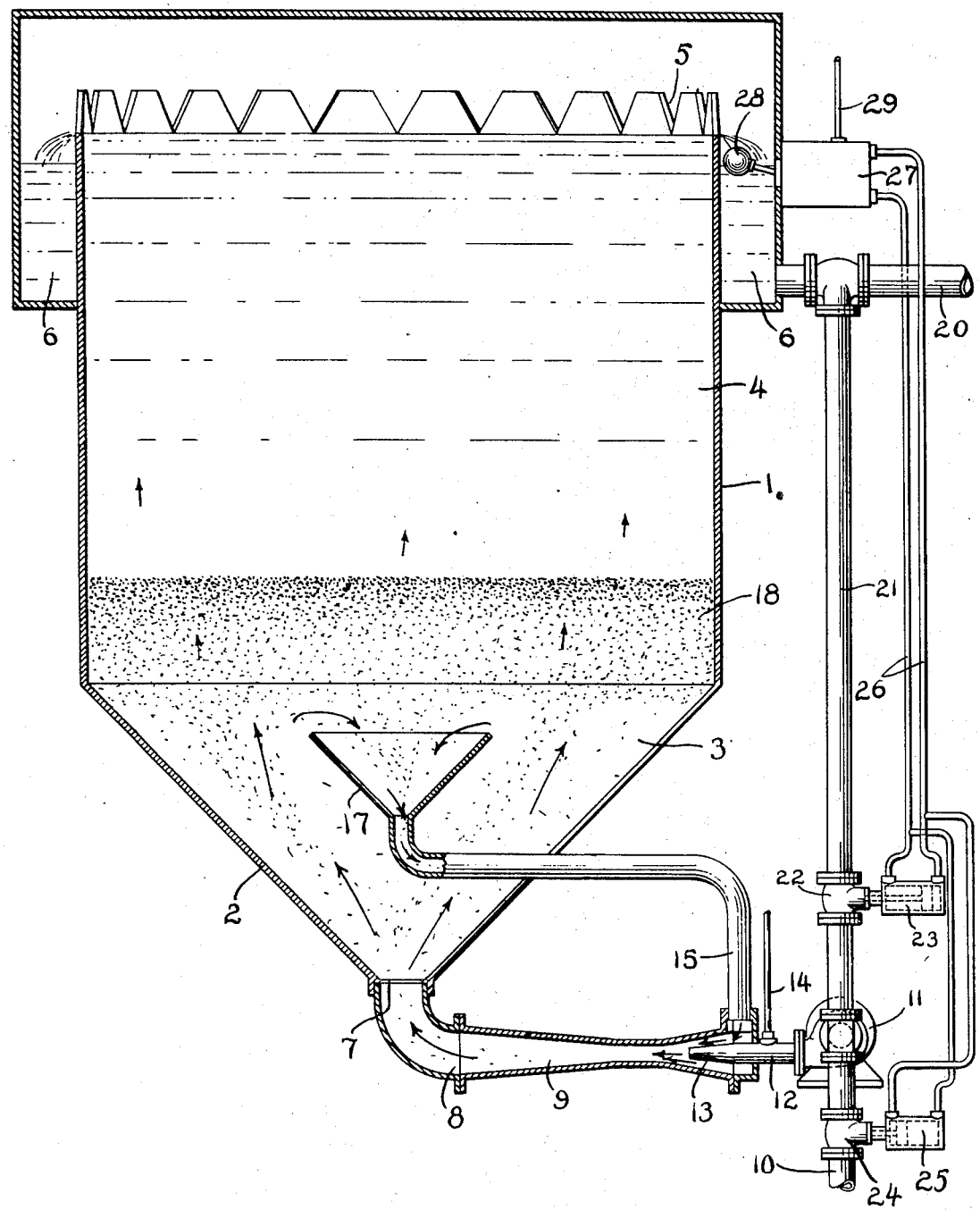
Joseph F. Sebald
INVENTOR
BY *Rolie Meyer*
ATTORNEY Patented Aug. 8, 1944

2,355,564

UNITED STATES PATENT OFFICE 2,355,564

WATER TREATING APPARATUS

Joseph F. Sebald, Bloomfield, N. J., assignor to Worthington Pump and Machinery Corporation, Harrison, N. J., a corporation of Delaware Application July 9, 1942, Serial No. 450,264

11 Claims. (Cl. 210—16)

This invention relates to water treating apparatus and more particularly to an improved cold process apparatus for softening, clarifying and purifying water.

The present invention embodies the advantages of the known fact that to add raw water and chemicals to a slurry containing previously precipitated particles improves and accelerates coagulation and purification of the water and accelerates the chemical and physical changes in separating out the formed substances or solids. The newly formed solids deposit by accretion on the particles present in the slurry rather than separating out as new small particles. These particles are relatively stable, being not readily subject to disintegration and of such nature that clear, treated water is readily separated from the slurry.

An object of the present invention is to provide an apparatus operating on the principle as above outlined which is constructed and arranged to efficiently treat a predetermined quantity of water in a predetermined length of time, the over-all size of which is materially smaller than the over-all size of water treating apparatus of approved make now on the market and having the same capacity per interval of time.

Another object of the present invention is to provide a water treating apparatus as specified which embodies means exteriorly of the main receptacle of the apparatus for mixing the raw water, chemicals and slurry containing partly precipitated foreign matter, thereby providing the thorough complete mixing prior to the entrance of the raw water into the receptacle.

More specifically, the invention comprehends the utilization of a venturi positioned in advance of the entrance of the raw water into the receptacle which forms the reaction or settling chamber and to provide means for delivering a predetermined quantity of slurry to the venturi, preferably in the throat thereof, and for mixing with the raw water and chemicals during the passage of raw water to the receptacle.

With these and other objects in view, as may appear from the accompanying specification, the invention consists of various features of construction and combinations of parts, which will be first described in connection with the accompanying drawing, showing in vertical section a water treating apparatus of the preferred form embodying the invention, and the features forming the invention will be specifically pointed out in the claims.

Referring more particularly to the drawing, the improved water treating apparatus comprises a receptacle 1, the bottom 2 of which is in the form of an inverted cone having its sides tapering inwardly and downwardly toward the axis of the receptacle 1. The receptacle 1 includes a reaction or settling portion 3, and a collection portion 4 for the clarified, treated water. The clarified treated water collected in the portion 4 accumulates and passes over the top serrated edge 5 of the receptacle 1 into the annular storage compartment 6, from which it is withdrawn for use as desired.

The receptacle 1 has an inlet 7 at the apex of the cone-shaped bottom 2. The inlet connection 8, attached thereto, is connected to the discharge end of a Venturi tube 9. Raw water is delivered from any suitable source (not shown) through the pipe 10 into the suction of a pump 11. The pump 11 discharges the raw water through a suitable connection 12 having a terminating nozzle 13, into the inlet end of the venturi 9. The chemicals for treating the water are introduced through a suitable connection 14, from any suitable supply source (not shown), into the stream of raw water prior to its entrance into the venturi 9, so that the raw water and chemicals will be partially mixed as they are discharged into the venturi 9.

A connection 15 is provided, opening into the inlet end of the venturi 9, and having a flared inlet 17 at its other end, positioned within the separation portion 3 of the receptacle 1, below the flock bed 18, so that slurry constituting partially precipitated foreign matter, chemicals, and water will flow through the connection 15 and into the venturi 9, wherein it will mingle with the incoming raw water and chemicals flowing therethrough. The slurry, raw water and chemicals will be thoroughly mixed in the expanding discharge section of the venturi 9 and will be discharged in a thoroughly mixed condition into the bottom of the receptacle 1, causing a precipitation of the foreign matter. The foreign matter precipitated will adhere to the previously precipitated foreign matter in the slurry, by accretion and accumulation, in the flock bed 18, through which the water will pass on its way to the top of the tank. The flock bed 18 serves or acts to separate out the precipitation, or precipitated particles, allowing clear, treated water to pass therethrough into the collection space 4 of the receptacle.

The water treating apparatus, including the venturi 9, is designed and constructed to operate at maximum efficiency with a predetermined quantity of fluid or water flowing therethrough, and a decrease in the quantity of fluid will result in a decrease in the efficiency of the apparatus. Therefore, for maintaining constant the quantity of fluid flowing through the apparatus at the point for which the apparatus was designed, without regard to the demand for treated water, means are provided for recirculating a part of the treated, purified water through the apparatus, thereby maintaining a predetermined quantity flow.

The treated water is delivered from the annular storage compartment 6 through a suitable outlet pipe 20 to any desired point of use. A pipe 21 connects into the pipe 20 and at its other end to the raw water inlet pipe 10, in advance of the pump 11. Valves 22 and 24 are placed in these pipes 21 and 10, respectively, the latter valve 24 being in advance of the junction of the pipe 10 with the pipe 21. These two valves, shown in the drawing as pressure controlled valves, are of any approved type such as may be purchased upon the open market, and are operated through the medium of their control cylinders 23 and 25, these cylinders being connected by pressure lines 26 to a three-way control valve structure 27. The valve structure 27 is also connected to a source (not shown) of pressure fluid, by the conduit or pressure line 29, which pressure fluid actuates the valve operating structures 23 and 25 for opening and closing the valves 22 and 24. The pressure fluid lines 26 are so arranged that when, by operation of the three-way valve 27, pressure is fed into one of such lines, the valve 22 will be opened and valve 24 simultaneously and proportionately closed, whereas, when pressure fluid is fed to the other of said lines 26, the reverse operation will result. This valve 27 is operated by the rise and fall of the float 28, which is affected by the level of water in the compartment 6, such level varying as the demand for treated water varies. When the level of water in the compartment 6 rises, due to decreased demand for treated water, the above-described structure will cause the valve 22 to open and the valve 24 to close, synchronously, decreasing the flow of raw water into the apparatus and increasing, in direct proportion, the recirculation of treated water. As the level in the compartment 6 falls, due to increased demand for treated water, the valve 22 is closed and valve 24 opened, proportionately and synchronously, decreasing the quantity of water recirculated and increasing the flow of raw water into the apparatus. Thus a constant flow of water is maintained through the apparatus at all times, insuring maximum efficiency of operation of the apparatus.

It is an inherent feature of the Venturi tube that it will automatically regulate the quantity of slurry which is taken from the settling or sedimentation portion 3 of the receptacle in proportion to the quantity of raw water passing through the Venturi tube.

While in the drawing the valves 22 and 24 are shown as pressure fluid operated valves, both controlled by the three-way valve 27 operated by the float 28, it is to be understood that if the arrangement of the various parts permits, the valves 22 and 24 may be operated by any other approved method, as electrical or mechanical, from the float 28, without departing from the spirit of the present invention.

It will be understood that the invention is not to be limited to the specific construction or arrangement of parts shown, but that they may be widely modified within the invention defined by the claims.

What is claimed is:

1. In a water treating and purifying apparatus, a water treating receptacle including a sedimentation portion and a treated water collection portion, said receptacle having an inlet into said sedimentation portion, and a Venturi tube having its discharge connected to said inlet, a supply pipe for raw water to be treated connected to the inlet of the said Venturi tube, means for delivering chemicals into said raw water prior to its entrance into said Venturi tube whereby the raw water and chemicals will be thoroughly mixed prior to their entrance into said receptacle, and a connection between said Venturi tube and said sedimentation portion for receiving slurry from the sedimentation portion and delivering it to said Venturi tube for mixture with the raw water and chemicals, and means for recirculating a part of the treated water from said collection portion back through said Venturi tube.

2. In a water treating and purifying apparatus, a water treating receptacle including a sedimentation portion and a treated water collection portion, said receptacle having an inlet to the sedimentation portion, a Venturi tube having its discharge connected to said inlet, a supply pipe for raw water connected to the inlet of said Venturi tube, and a connection between the throat of said Venturi tube and said sedimentation portion for delivering slurry from the said sedimentation portion to said Venturi tube for mixture with the raw water prior to its entrance into the receptacle, and means for recirculating a part of the treated water from said collection portion back through said venturi.

3. In a water treating and purifying apparatus, a water treating receptacle including a sedimentation portion and a treated water collection portion, said receptacle having an inlet into said sedimentation portion, and a Venturi tube having its discharge connected to said inlet, a raw water supply pipe and a chemical supply pipe for delivering raw water and chemicals to the inlet of said Venturi tube for thoroughly mixing the raw water and chemicals prior to their entrance into the receptacle, and means for recirculating a part of the treated water from said collection portion back through said Venturi tube, and means actuated by the water level in said collection portion for controlling the quantity of recirculated treated water in inverse proportion to the quantity of raw water delivered to the venturi.

4. In a water treating and purifying apparatus, a water treating receptacle including a sedimentation portion and a treated water collection portion, said receptacle having an inlet into said sedimentation portion, and a Venturi tube having its discharge connected to said inlet, a supply pipe for raw water to be treated connected to the inlet of the said Venturi tube, means for delivering chemicals into the water prior to its entrance into said Venturi tube whereby the raw water and chemicals will be thoroughly mixed prior to their entrance into said receptacle, and a connection between said Venturi tube and said sedimentation portion for receiving slurry from the sedimentation portion and delivering it to said Venturi tube for mixture with the raw water and chemicals, means for recirculating a part of the treated water from said collection portion back through said Venturi tube, and means actuated by the quantity of treated purified water in said receptacle for controlling the quantity of treated water recirculated through said venturi.

5. In a water treating and purifying apparatus, a water treating receptacle including a sedimentation portion and a treated water collection portion, an annular storage compartment for treated purified water about said receptacle, said receptacle having an inlet into said sedimentation portion, a Venturi tube having its discharge connected to said inlet, a supply pipe for raw water to be treated connected to the inlet of said Venturi tube, means for delivering chemicals to the incoming raw water prior to its entrance into said Venturi tube, means connecting said annular storage compartment and said Venturi tube for passing a part of the treated purified water back to the Venturi tube for circulation through the apparatus, a valve in said connection between said annular storage space and said Venturi tube, and means actuated by variances of the level of treated purified water in said annular storage space for controlling operation of said valve.

6. In a water treating and purifying apparatus, a water treating receptacle including a sedimentation portion and a treated water collection portion, said receptacle having an inlet to said sedimentation portion, a supply pipe for raw water to be treated, means for delivering chemicals into the raw water to be treated, and mixing means exteriorly of said receptacle and having inlet connection with said raw water supply means and discharge connection into the inlet of said receptacle, and a connection from said sedimentation portion to said mixing means for delivering slurry from the sedimentation portion for mixture with the raw water and chemicals prior to their entrance into the receptacle, said mixing means utilizing the pressure and velocity of the incoming raw water to effect mixing of the slurry and raw water, and means for introducing treated water from said collection space into said raw water stream in advance of said mixing means.

7. In a water treating and purifying apparatus, a water treating receptacle including a sedimentation portion and a treated water collection portion, said receptacle having an inlet to said sedimentation portion, a supply pipe for raw water to be treated, means for delivering chemicals into the raw water to be treated, and mixing means exteriorly of said receptacle and having inlet connection with said raw water supply means and discharge connection into the inlet of said receptacle, and a connection from said sedimentation portion to said mixing means for delivering slurry from the sedimentation portion for mixture with the raw water and chemicals prior to their entrance into the receptacle, said mixing means utilizing the pressure and velocity of the incoming raw water to effect mixing of the slurry and raw water, means for introducing treated water from said collection space into said raw water stream in advance of said mixing means, and means actuated by variances of the level of treated purified water in the apparatus for controlling the quantity of treated purified water delivered into said stream of raw water.

8. In a water treating and purifying apparatus, a water treating receptacle including a sedimentation portion and a treated water collection portion and having an outlet for treated water, said receptacle having an inlet to said sedimentation portion, a Venturi tube having its discharge connected to said inlet, means for delivering slurry from said sedimentation portion to the inlet end of said Venturi tube, a raw water supply pipe, a nozzle at the discharge end of said raw water supply pipe and extending into the inlet end of said Venturi tube to discharge raw water into the Venturi tube, the raw water entering the Venturi tube acting as an inductor to draw slurry into the tube and to thoroughly mix the slurry and raw water in the tube, and means actuated by variances in the level of treated water in said treated water collection space for controlling the quantity of raw water delivered to said nozzle.

9. In a water treating and purifying apparatus, a water treating receptacle including a sedimentation portion and a treated water collection portion and having an outlet for treated water, said receptacle having an inlet to said sedimentation portion, a Venturi tube having its discharge connected to said inlet, means for delivering slurry from said sedimentation portion to the inlet end of said Venturi tube, a raw water supply pipe, a nozzle at the discharge end of said raw water supply pipe and extending into the inlet end of said Venturi tube to discharge raw water into the Venturi tube, the raw water entering the Venturi tube acting as an inductor to draw slurry into the tube and to thoroughly mix the slurry and raw water in the tube, and means for delivering a chemical reagent into said nozzle for mixing with the raw water prior to its discharge into the Venturi tube, means actuated by variances of the level of treated water in said treated water collection space for controlling the quantity of raw water delivered to said nozzle.

10. In a water treating and purifying apparatus, a water treating receptacle including a sedimentation portion and a treated water collection portion and having an outlet for treated water, said receptacle having an inlet to said sedimentation portion, a Venturi tube having its discharge connected to said inlet, means for delivering slurry from said sedimentation portion to the inlet end of said Venturi tube, a raw water supply pipe, a nozzle at the discharge end of said raw water supply pipe and extending into the inlet end of said Venturi tube to discharge raw water into the Venturi tube, the raw water entering the Venturi tube acting as an inductor to draw slurry into the tube and to thoroughly mix the slurry and raw water in the tube, a valve in said raw water supply pipe, means for operating said valve, and means operated by variances in the level of treated water in said treated water collection space for controlling operation of said valve operating means.

11. The method of treating water that includes separation of the water and solid particles which comprises the steps of establishing a vertically rising column of water, accumulating in the lower portion of said column solids from previously treated water to form a slurry, delivering water to be treated into the lower portion of said column at a pressure sufficient to agitate the slurry to maintain in suspension substantially all the solids in the lower portion of the column, utilizing the velocity of the water to be treated as an eductor medium to draw slurry from the lower portion of the water column and mix it with the water to be treated flowing to the column of water, stilling the slurry above the zone of agitation to create a condition of relative quiescence, storing treated water above the region of relative quiescence, returning a part of the stored treated water to the lower portion of said column, controlling the quantity of water to be treated which is delivered to the lower portion of the column in proportion to the quantity of treated water returned to the lower portion of the column to maintain substantially constant the quantiy of water delivered to the lower portion of the column, and withdrawing treated water from the zone of storage.

JOSEPH F. SEBALD.